Herbert O. Corbett
John J. Quackenbush
Charles H. Allen
INVENTORS

BY E. J. Berry
ATTORNEY

Oct. 7, 1969

H. O. CORBETT ET AL 3,471,606

PRODUCING THERMOPLASTIC FILMS

Filed March 18, 1964

Herbert O. Corbett
John J. Quackenbush
Charles H. Allen
INVENTORS

BY E. J. Berry
ATTORNEY

United States Patent Office 3,471,606
Patented Oct. 7, 1969

3,471,606
PRODUCING THERMOPLASTIC FILMS
Herbert O. Corbett, Bridgeport, John J. Quackenbush, Monroe, and Charles H. Allen, Fairfield, Conn., assignors, by mesne assignments, to Mobil Oil Corporation, New York, N.Y., a corporation of New York
Filed Mar. 18, 1964, Ser. No. 352,841
Int. Cl. B29d 23/04
U.S. Cl. 264—209　　　　　　　　　　　　　　11 Claims

ABSTRACT OF THE DISCLOSURE

Process for the extrusion and controlled stretching of organic polymeric films or tubes while the polymeric material retains heat from the melt extrusion step wherein each edge of the extruded article is firmly gripped between a pair of moving endless web guides (e.g., chains or belts). Each pair of web guides is pivotally mounted on for either parallel alignment of the two pairs of guides to prevent shrinkage ("necking") of the web as it cools or for diverging alignment for stretching the web in a transverse direction, and the web is usually stretched in the machine direction immediately upon release from the web guides under the tension induced by casting rolls rotating at a higher linear speed than the guides in producing films which display the desirable characteristics of both blown and cast films.

---

This invention relates to the improved production of continuous extruded thermoplostic articles. It is especially concerned with methods for handling continuous films.

In producing thin thermoplastic films for packaging and many other uses, two principal techniques have been employed. By one technique, blown film is made by extruding a continuous hollow tubular film of the molten material and stretching it before it cools by inflation by a jet of air introduced through a pipe passing through the extrusion die. Such film has good impact resistance and modulus as well as a desirably low tendency toward splitting in the machine (longitudinal) direction; however, its appearance is generally inferior to that of cast film in respect to clarity and gloss. The other technique involves the production of flat or cast (extruded) films which are not only clearer and glossier than blown film but, also, may be made at higher production rates with better gage control. However, conventional cast film is oriented in only the machine direction and accordingly lacks strength in the transverse direction. While this deficiency can be cured by reheating the film and stretching it in a transverse direction, this of course involves additional processing and equipment costs. Various efforts have been made to combine the desirable qualities of both blown and cast film in a single product but success in this field has been limited.

The present invention concerns improved processes for the manufacture of shaped articles which may have improved properties by extruding molten thermoplastic organic polymeric material to form a continuous shaped article (for example, a film) having edge margins, continuously and uniformly gripping the moving edge margins in a location immediately adjacent to the extrusion die without substantial slippage to restrain said article against substantial reduction in width and against substantial change in length while so gripped and while said extruded article is still at a temperature above the softening point of said thermoplastic material as a result of retained melt extrusion heat.

Other aspects of the invention relate to one or more of such features as alternatively maintaining the width of said article substantially constant or stretching it transversely while so gripped, extending the article longitudinally immediately after releasing the grip on the edge margins, gripping a plurality of extruded articles simultaneously, extruding hollow articles, positively drawing the molten article longitudinally away from the melt extrusion operation at a higher speed than the normal linear rate of extrusion and accomplishing such restraint of the edge margins with endless web guides converging to form nips which engage each edge margin.

A preferred form of apparatus suitable for carrying out such processes preferably includes one or more such features as pairs of coacting endless web guides which do not pierce the extruded article, cooling means for the guides, means for adjustably adjusting and fixing each said pair of web guides relative to the plane of the lips of the extrusion die, means for adjusting the clearance and releasing the web guides from engagement with the edge margins of the article, and one or more casting or chill rolls operating at higher linear speed than the web guides for drawing the article longitudinally following its release from said web guides.

The process of this invention is suitable for the production of continuous shaped articles from any thermoplastic material which may be adaptable to melt extrusion. Among the many suitable materials are the polymers and copolymers of polypropylene, polyethylene, polystyrene, polyvinylidene and polyvinyl chlorides, polyethyleneterephthalate, and the like.

For a better understanding of the nature, objects and advantages of this invention, reference should be had to the accompanying drawings in which a number of minor features of construction and mechanical details have been omitted for greater clarity.

Figure 1:
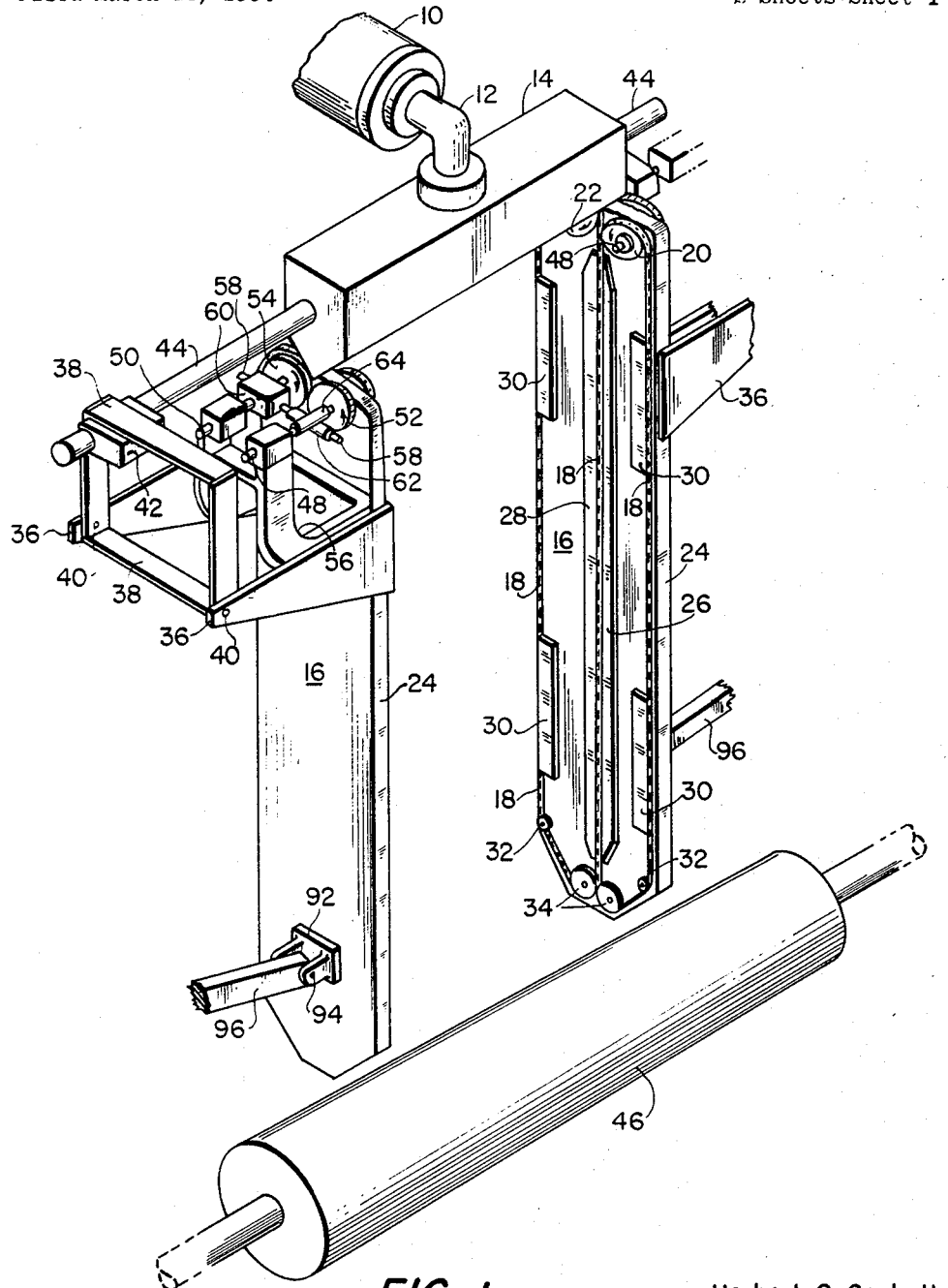
FIGURE 1 is a fragmentary isometric view of one form of apparatus according to the invention.

Turning now to FIGURE 1, the cylinder 10 of a heated extruder of the worm screw type is connected by die feed conduit 12 to the heated die 14. The die face (not shown) at the bottom of this die is provided with a long thin orifice or slot of uniform width.

Two web guide assemblies 16 are located adjacent to the die face near each end of the orifice. Each of these assemblies contains a pair of coacting endless web guides 18 in the form of flat chains which converge at the nip of the positively driven sprockets or pulleys 20 and 22 and then move together at the same speed away from the die face.

A wide variety of flexible web guides may be employed for engaging the edge margins of the hot extruded film or sheet including endless belts, ropes, wires, cables, tapes or chains constructed of metal, fiberglass, polytetrafluoroethylene, polychlorotrifluoroethylene or other heat-resistant materials. For instance, a solid ribbon or belt of flexible sheet metal or either of the two fluorocarbon resins may be utilized as may a woven fiberglass belt or tape. Unless manufactured as integral loops, the ends of the various materials may be joined to form endless loops by links or staples or by welding, splicing or sewing depending on the form of material selected. However, a flat metal chain is preferred for most purposes; and this may take the form of either a so-called "silent chain" (much employed in automotive motors) having a flat surface on one face or side for engaging the extruded material and projecting lugs on the reverse face for engaging the sprockets or, alternatively, a roller chain of the type used on bicycles. When materials other than chains are selected for the purpose, it is desirable to utilize suitably flanged or grooved pulleys rather than sprockets for the oppositely rotating members 20 and 22.

The web guides move around the support plates 24 on a plurality of additional guiding devices including the adjustable inner shoes 26 and 28 which are described later and the fixed outer shoes 30 are well as idler pulleys 32 and 34. The idlers 34 are desirably mounted on slotted bases (not shown) bolted to plates 24 in order to provide for adjusting the tension of the web guides 18. In addition, the various shoes are customarily furnished with longitudinal grooves and the pulleys with flanges in order to prevent the endless web guides from slipping off of these supports.

An atomizing spray head (not shown) or other suitable device may be incorporated in the apparatus to cool each web guide during its return travel between outer shoes 30 by the application thereto of a vaporizable liquid for example, by spraying a mist of aqueous ethanol onto the web guides. The resulting vaporization dissipates the heat picked up from the molten article and enables the cool web guides to again absorb heat from the edge margins of the article sufficiently to strengthen those margins against tearing on the web guides. Alternatively, the web guide assemblies may be cooled by employing cored or hollow support plates 24 and circulating a cooling medium or refrigerant therethrough.

Each assembly 16 comprises a metal support plate 24 to which are fixed the projecting brackets 36. These brackets may be cast integrally with the plate 24 or firmly attached thereto by welding or by bolts or any other suitable means. Brackets 36 are also pivotally attached to the box frame member 38 by means of the pivot pins 40. A journal block 42 is adjustably fastened to the frame 38 by bolts or other suitable means and this block is provided with an opening therethrough for slidable and rotatable engagement with the horizontal support rod 44 which is rigidly attached to the die 14.

From the foregoing description, it is apparent that both of the web guide assemblies 16 are independently capable of several types of movement. They may be moved back and forth horizontally on the support rods 44 in straight line motion toward or away from the die to place them in the proper positions relative to the edges of the extruded melt. These assemblies may also both be pivotally swung around the rods 44 to any selected plane ranging from the vertical shown to the horizontal or any point therebetween. After such adjustment, each box frame 38 may be locked in the selected position against such straight line and rotary motions by tightening a thumb or set screw (not shown).

In addition each web guide assembly 16 may be moved pivotally around pins 40 as center thereby increasing or decreasing the distance between their discharge ends (the lower ends at which idler pulleys 34 are located). It will be apparent that this pivotal motion permits the two guide assemblies to be brought into parallel or diverging alignment thereby respectively either maintaining or varying the width of the article carried by the guides. Further, the guide assemblies may be vertically raised or lowered to adjust the gap between the die orifice and the nips of the web guides, and this may be accomplished by suitable set screws (not shown) in box frame 38, which control the position of the journal block 42 relative to the frame 38.

A conventional chilled casting roll 46 or set of such rolls may be located adjacent to the discharge end of the web guides to take off the plastic article and cool it. This roll may be cooled by known means, i.e., by circulating a cooling fluid through the roll or by partial immersion of the roll in water, and desirably it is driven by a conventional variable speed drive at a surface or linear speed at least equal to that of the web guide chains 18. When it is desired to stretch the article in the machine direction, the speed of the casting roll 46 is increased above that of the web guides to the extent necessary to impart the selected amount of longitudinal stretching.

Instead of employing a chilled roll, the plastic web may be chilled by immersion in a bath of water or other suitable liquid maintained at the desired temperature. As a further alternative, in some cases it may be desirable to cool the plastic article below its softening point while still carried by the web guides. This may be accomplished by directing one or more jets of unheated air to strike the surface of the article in the general region of the discharge end of the guide chains or belts. During operation of the device, the web guides 18 are driven by the sprockets 20 and 22 which engage the chain guides under a moderate degree of tension. These sprockets are fixed to the shafts 48 and 50, respectively, which also have meshed gears 52 and 54 respectively fixed thereon to keep the motion of each pair of web guides synchronized. The shafts 48 and 50 are journaled in bearings in both the support plate 24 and the L-shaped yoke bracket 56 which is rigidly attached to support plate 24 by welding or other suitable means. The rotating shaft 58 passing through right angle gear box 60 also turns the sprocket shaft 50 by means of suitable gears (not shown) inside box 60. Sprocket shaft 50 drives sprocket shaft 48 in the opposite direction through the medium of gears 54 and 52. This, of course, drives the two sprockets 20 and 22 in opposite rotation to set both web guides 18 of each pair into synchronized travel through the nip of the two sprockets. Guide sleeves 62 and 64 are desirably employed to maintain shaft alignment between rotating shaft 58 and sprocket shaft 48.

The supporting and power transmission units for both left and right web guide assemblies are of similar construction, and the two drive shafts 58 and associated gears and sprockets are driven at the same speed by flexible shafts (not shown) attached to the same variable speed transmission or to two synchronized transmissions of this type which are in turn powered by suitable motors. Flexible drive shafts are employed for driving the shafts 58 in order to enable the latter to be moved in any direction when adjusting the web guide assemblies in any of the various directions described herein. A considerable range of speed regulation by means of the transmissions is desirable to accommodate a wide variety of plastic materials of varying thickness being extruded through dies of various sizes. Also, conventional reversing means for simultaneously reversing both driving trains may be useful for backing the web guides to clear jams or torn film from the guides if occasion arises.

Figure 2:
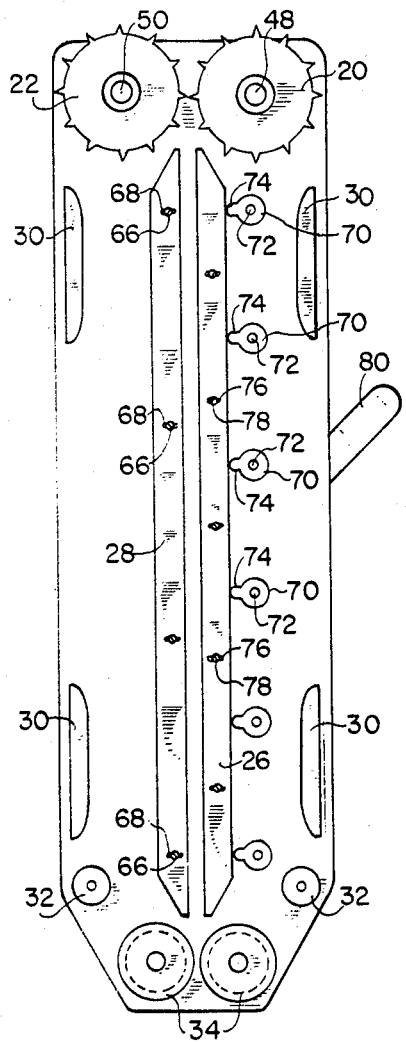
FIGURE 2 is an elevation view of the interior face of a web guide assembly with the web guides removed.

FIG. 2 illustrates the interior of a web guide assembly with the web guides removed. The shoe 28 is fastened securely to the support plate 24 by clamping bolts or machine screws 66 which extend through elongated slots 68 in shoe 28 and then engage matching threads in plate 24. Slots 68 permit a restricted amount of adjustment of shoe 28 toward or away from shoe 26 to set the desired gap between the web guides or each pair; then shoe 28 is clamped rigidly in place on plate 24. Optionally, each long shoe 28 may be replaced by two or more shorter shoes similarly mounted to provide independent control of the gap between the web guides at two or more stages during passage through the guides.

The opposite shoe 26 is positioned in a different manner by means of a series of cams 70 mounted on shafts 72 which are simultaneously partially rotated by a common mechanism to bring the cam lobes 74 to bear on the shoe and push it into operating position. This shoe is attached to plate 24 in such manner as to permit restricted movement toward and away from the shoe 28. Elongated slots 76, similar to the slots 68, are provided at intervals along the shoe 26, and the bolts 78 extend through the slots and threadedly engage tapped holes of restricted depth in plate 24. The length and diameter of these bolts is selected to hold the shoe 26 snugly against plate 24 without binding and to provide for freedom of movement that is limited by the engagement of bolts 78 with slots 76 and actuated by cams 70.

Figure 3:
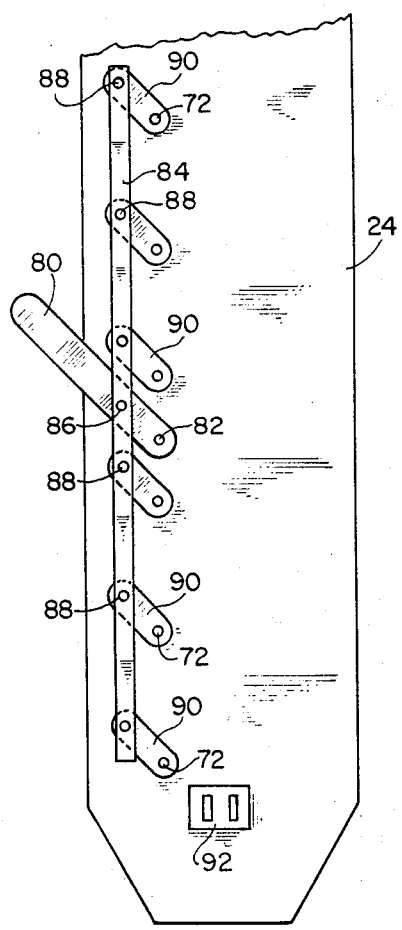
FIGURE 3 is fragmentary elevation of the exterior face of a web guide assembly.

The operating mechanism for the cams is shown on the exterior of the web guide assembly in FIG. 3. It consists of a lever 80 pivotally mounted on the pin 82 which is fixed in plate 24. A link 84 is rotatably connected to this lever by the pivot pin 86 which is affixed to lever 80. The pivots 88 further connect the link 84 to each of the crank arms 90 which are rigidly fixed on the shafts 72 which have the cams 70 fixedly mounted on the other (inner) ends of these shafts. Consequently, moving the lever 80 up or down rotates the cams 70 through a limited predetermined arc.

As illustrated in FIG. 1, the cams are in operating position with their lobes 74 bearing against the shoe 26 and urging it against the tension of the web guide 18 toward the shoe 28. When occasion arises, as for instance if the film is either torn or jammed in the mechanism, the grip of the web guides on the films can be rapidly released by simply throwing both levers 80 to the downward position to enable the operator to clear the machine.

Clevis brackets 92 are welded or otherwise affixed to the support plates 24 near the discharge ends of assembles 16. These brackets are pivotally connected by pins 94 to the struts 96 which are preferably extensions of racks or connected to the racks of rack-and-pinion assemblies (not shown). Thus the struts 96 actually control the positions of the discharge ends of the web guides; that is, these struts in conjunction with the two pivotal axes of pins 40 and rods 44 establish the angular relation of each web guide assembly 16 to the plane of the lips of the extrusion die. For example, pulling each strut 96 outward rotates each guide assembly about the pivot 40 and aligns them in a diverging fashion wherein the discharge or lower ends of web guides 18 are farther apart than their entrance or upper ends. Such divergence produces an equivalent amount of transverse stretching of the article that results in orientation on the transverse axis of films which are subject to orientation. The struts 96 are adjusted to produce the desired alignment of the web guides; then the struts are customarily fastened rigidly by suitable means against movement. If films with deckled edges are desired an appropriate mechanism is connected to both struts 96 for oscillating the web guide assemblies in unison in short arcs which are approximately parallel to the axis of chill roll 46 and centered on the pivot pins 40 in each assembly.

In one illustration of the method of the present invention on the particular type of apparatus described, molten polypropylene is forced by the extruder 10 through the die feed conduit 12 into the heated die 14 and emerges from the slot in the face of the die as a film of greater thickness than the final article. As soon as front end or foremost part of this film web reaches the nip at the sprockets 20 and 22 and is engaged by the moving web guides 18, it is automatically threaded or led through the entire joint travel of the web guides.

The web guides may be driven at the same or at a substantially higher rate (e.g., up to 390 or more feet per minute with some resins and dies) than the linear rate of extrusion from the die under the influence of gravity alone. These guiding devices grip the edge margins of the film while at a temperature above its softening point by means of the pressure exerted between each pair of coacting chains. When the web guide assemblies are in parallel alignment, this restrains the film against lateral shrinkage (necking down) while being carried by the web guides and substantially maintains the original extruded width of the film. At the discharge end of the guides at idler pulleys 34, the film, which is still at a temperature above the softening point of the resin, is drawn off by the chilled roll under tension. Roll 46 is turning at a considerably higher linear speed than the web guides, and this stretches the film in the machine direction a predetermined amount, thereby orienting the polypropylene film in this direction to the desired degree and reducing the thickness of the film.

The guide chains 18 in passing back to the drive sprockets 20 and 22 are cooled as described earlier. The cool links of the chains then cool the edge margins of the freshly extruded, hot film by gripping them during the next cycle of chain travel.

In another operation with the same apparatus, the discharge ends of guide assemblies 16 are each swung apart through equal angles by movement of the struts 96 and fastened in their new positions to provide diverging web guides for the purpose of stretching the film of polypropylene transversely while it is being carried between web guides. When the web guides are displaced in this manner by pivoting around the pins 40, the sprockets 20 and 22 are desirably brought back near their original positions by sliding the hangers 42 inward on the horizontal support rods 44. If necessary or desirable, the guide assemblies 16 may be raised to bring the nips of those sprockets back up to their original level, that is closer to the die orifice. With this set up, a polypropylene film from a die orifice 15″ wide and 0.015″ thick may be extended transversely into a 42″ web to give only one specific illustration.

Thickened or beaded edges on the extruded article are generally preferred for ease of handling. However, the technique of the present invention is also applicable to extruded articles of uniform thickness throughout by adjusting guide shoes 26 and 28 for the proper gap to assure a firm grip of the web guides on the particular film.

The present process and apparatus are also adaptable to the processing of laminated or multilaminar articles by merely providing a plurality of extrusion dies disposed as close as possible to the nips of the two pairs of converging web guides and directing the various extruded sheets or films into the nips.

Figure 4:
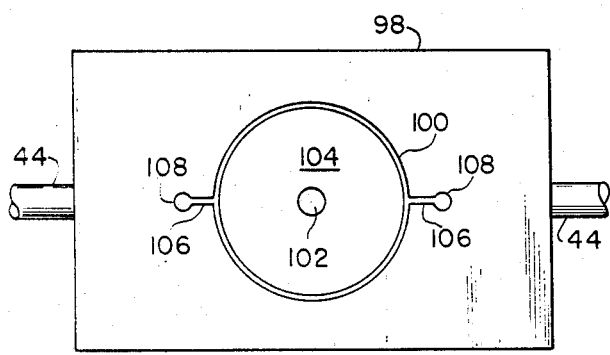
FIGURE 4 is an elevation of the face of one embodiment of the die.

Tubular films can also be handled accordingly to the present invention by providing longitudinal flanges or edge margins on the extruded article as illustrated in FIG. 4. The die 98 connected to the support rods 50 is provided with an annular extrusion orifice 100 and the port 102 in the otherwise imperforate central section 104 of the die face. From the port 102, air is evacuated by a vacuum pump or other suction device to deflate the tubular extruded film and produce a two-layer laminar structure. The melt extrusion orifice, which may also be an elliptical or other endless slot, is modified by the communicating slots 106 on diametrically opposite sides of the annular orifice 100; and these desirably terminate in the thickened portions 108 to provide beaded flanges along the length of the extruded tubular film. The flanges of the article are engaged by the web guides and handled therein in the manner described earlier in connection with the processing of single layer films.

Many advantages are derived from the present invention including those mentioned hereinafter. It minimizes or eliminates any necking down or other reduction in the width of the film extruded thereby providing improved control of the width of the film and secondarily of its thickness. The width of the film extruded from a single die orifice of fixed width may be varied as desired over a considerable range, and this permits the use of fewer dies and less expensive dies with orifices much narrower than the final article. This variable width control also minimizes the amount of edge trimming and the trimmed material which must be reprocessed. In addition, it is not necessary in all cases to extrude a film with the preferred beaded or thickened edges, inasmuch as the pressure between the coating endless web guides may be adjusted for a positive grip on the margins or borders adjacent edges of the film rather than retaining the film in the guides solely by engagement with thickened edges. When a beaded edge is employed, the bulk density of the trim is increased and this material is more readily ground for return to the extruder than thin film material.

The equipment is easier to thread and thus minimizes the delays and waste material encountered in threading a new film through the entire length of the guides by hand as is necessary with some web guides. This is especially advantageous when the guides are submerged in a liquid coolant as in water bath casting operations, for example.

The instant process may be operated with a positive draw of the article from the die lips by adjusting the speed of the endless web guides higher than the normal rate of extrusion of the melt; and this provides infinitely graduated variable control of the haul off speed with the rate of melt output of the die itself as the only limiting factor on speed.

By disposing the web guide assemblies in a selected diverging angular relationship, the article may be selectively stretched transversely to a predetermined width and thickness while still retaining heat from the melt extrusion operation. This avoids reheating the film at a later stage for the purpose of stretching it as in conventional operations. Thus heat is saved and less equipment is required in the instant process. Selective longitudinal extension or stretching with further control of the thickness may be obtained also while the melt is still above the softening point by merely adjusting the speed of the usual chill or casting roll which follows the web guides to a higher linear speed than the guides. With polypropylene and other films subject to orientation by such stretching, these extensions of the film provide controlled orientation in either or both transverse and longitudinal directions.

By transversely extending a flat film while it is still hot from the extrusion operation, the product may have a combination of the more desirable qualities of both blown tubular and cast films while eliminating the disadvantages of both; that is, the film possesses the high clarity and gloss characteristics of cast film along with the preferred physical attributes of blown tubular film including higher impact resistance and modulus, as well as less tendency to split in the machine direction. In one embodiment of the invention, tubular films may be extruded or processed under the control of the endless web guides. Additional improvement of the quality of a film product results from the larger than usual separation of the die and the casting roll or rolls as this provides for some degree of atmospheric web cooling and thus reduces the temperature differential between the web and chill roll at the time of contact. The optical properties, including gloss, are improved by the longer dwell time in air before being picked up by the casting roll in the case of certain materials, such as polyethylene and polypropylene. Gauge bands, that is, irregularities in film thickness, are reduced by the transverse extension obtained with diverging web guide assemblies.

Also the invention is applicable to laminating multi-layer articles containing a plurality of superposed films of the same or different resins. Deckling of films may be accomplished by oscillating the discharge ends of the pivoted web guide assemblies in unison across the face of the chill roll.

It will be apparent to those skilled in the art that many modifications and substitutions of equivalents may be made in the process and apparatus of the present invention without departing from its spirit or scope. Accordingly, this invention should not be regarded as restricted to any particular features of construction, processing or mechanical details except as may be recited in the appended claims or required by the prior art.

What is claimed is:

1. A process which comprises heating thermoplastic organic polymeric material to the molten state, continuously extruding said molten material from a die to form a continuous shaped article having edge margins, continuously and uniformly gripping the moving edge margins in a location immediately adjacent to said die without substantial slippage to restrain said article against substantial reduction in width and against substantial change in length while so gripped and while said extruded article is still at a temperature above the softening point of said thermoplastic material as a result of heat retained therein from said heating step.

2. A process according to claim 1 in which the edges of said article are maintained substantially parallel while so gripped.

3. A process according to claim 1 in which said article is extended transversely while so gripped.

4. A process according to claim 1 and the step of longitudinally extending said article immediately after releasing said grip on the edge margins.

5. A process according to claim 1 in which said article is extended transversely while so gripped and is extended longitudinally immediately thereafter.

6. A process according to claim 1 in which said article is a film.

7. The process according to claim 1 in which said article is extruded in the form of a hollow article.

8. A process according to claim 1 in which said molten article is drawn longitudinally from said die at a higher speed than the normal linear rate of extrusion.

9. A process according to claim 1 in which a film is drawn longitudinally from said die at a higher speed than the normal linear rate of extrusion, said extruded film is extended transversely while said edge margins are so gripped and extended longitudinally immediately thereafter.

10. A process according to claim 1 in which said restraint is accomplished with a plurality of pairs of endless web guides moving at substantially the same speed with the guides in each said pair converging to form a nip engaging one of said edge margins and then traveling together away from said die with the guides in each said pair in substantially parallel alignment and gripping said edge margin therebetween.

11. A process according to claim 10 in which said endless web guides are cooled during at least a part of their travel out of gripping engagement with said edge margins.

References Cited

UNITED STATES PATENTS

| 2,276,615 | 3/1942 | Hozelett | 65—193 |
| 2,578,986 | 12/1951 | Schoonenberg et al. | 65—193 |
| 2,659,931 | 11/1953 | Dettmer | 18—1 |
| 2,832,994 | 5/1958 | Ahlich et al. | 18—1 |
| 3,124,834 | 3/1964 | Vandierandonck | 18—1 |
| 3,132,375 | 5/1964 | Koppehele | 18—1 |
| 3,211,816 | 10/1965 | Brown | 18—1 |
| 2,334,022 | 11/1943 | Minich | 264—289 |
| 2,618,012 | 11/1952 | Milne | 264—289 |
| 3,254,146 | 5/1966 | Quinn | 264—210 |
| 2,412,187 | 12/1946 | Wiley et al. | 264—210 |
| 3,261,903 | 7/1966 | Carr | 264—210 |

ROBERT F. WHITE, Primary Examiner

J. R. THURLOW, Assistant Examiner

U.S. Cl. X.R.

264—210, 237, 289